(12) United States Patent
Gupta et al.

(10) Patent No.: US 8,424,200 B2
(45) Date of Patent: Apr. 23, 2013

(54) CONDUCTING NANOTUBES OR NANOSTRUCTURES BASED COMPOSITES, METHOD OF MAKING THEM AND APPLICATIONS

(75) Inventors: Mool C. Gupta, Yorktown, VA (US); Yonglai Yang, Newport News, VA (US); Kenneth L. Dudley, Newport News, VA (US); Roland W. Lawrence, Seaford, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 1062 days.

(21) Appl. No.: 12/098,000

(22) PCT Filed: Dec. 19, 2006

(86) PCT No.: PCT/US2006/048165
§ 371 (c)(1),
(2), (4) Date: Nov. 19, 2008

(87) PCT Pub. No.: WO2008/045109
PCT Pub. Date: Apr. 17, 2008

(65) Prior Publication Data
US 2010/0000770 A1 Jan. 7, 2010

Related U.S. Application Data

(60) Provisional application No. 60/751,705, filed on Dec. 19, 2005.

(51) Int. Cl.
*H01R 43/00* (2006.01)
(52) U.S. Cl.
USPC ............................................ 29/825; 977/783

(58) Field of Classification Search .................. 977/783, 977/785; 29/825
See application file for complete search history.

(56) References Cited

U.S. PATENT DOCUMENTS

| | | | |
|---|---|---|---|
| 2003/0035917 A1* | 2/2003 | Hyman | 428/67 |
| 2003/0077515 A1* | 4/2003 | Chen et al. | 429/231.8 |
| 2003/0185741 A1* | 10/2003 | Matyjaszewski et al. | 423/445 R |
| 2004/0095658 A1* | 5/2004 | Buretea et al. | 359/853 |
| 2004/0182285 A1* | 9/2004 | Mazany et al. | 106/600 |
| 2004/0211151 A1* | 10/2004 | Fanucci | 52/745.19 |
| 2005/0079386 A1* | 4/2005 | Brown et al. | 428/690 |
| 2005/0248768 A1* | 11/2005 | Pettit | 356/432 |

OTHER PUBLICATIONS

Yang, "Novel Carbon Nanotube-Polystyrene Foam Composites for Electromagnetic Interference Shielding", Nano Letters, 2005, pp. 2131-2134, vol. 5, No. 11, American Chemical Society.
Yang, "Conductive Carbon Nanofiber-Polymer Foam Structures", Advanced Materials, 2005, pp. 1999-2003, vol. 17, Wiley-VCH Verlag GmbH & Co.

(Continued)

*Primary Examiner* — Jeremy Norris
(74) *Attorney, Agent, or Firm* — Robert J. Decker (57) ABSTRACT

An electromagnetic interference (EMI) shielding material includes a matrix of a dielectric or partially conducting polymer, such as foamed polystyrene, with carbon nanotubes or other nanostructures dispersed therein in sufficient concentration to make the material electrically conducting. The composite is formed by dispersing the nanotube material in a solvent in which the dielectric or partially conducting polymer is soluble and mixing the resulting suspension with the dielectric or partially conducting polymer. A foaming agent can be added to produce a lightweight foamed material. An organometallic compound can be added to enhance the conductivity further by decomposition into a metal phase.

41 Claims, 4 Drawing Sheets

OTHER PUBLICATIONS

Yang, "A Comparative Study of EMI Shielding Properties of Carbon Nanofiber and Multi-Walled Carbon Nanotube Filled Polymer Composites", Journal of Nanoscience and Nanotechnology, 2005, pp. 927-931, vol. 5, American Scientific Publishers.

Yang, "Electrical Conductivity and Electromagnetic Interference Shielding of Multi-Walled Carbon Nanotube Filled Polymer Composites", Materials Research Society Symposium Proceedings, 2005, pp. HH5.3.1-HH5.3.5, vol. 858E, Materials Research Society.

Yang, "The Fabrication and Electrical Properties of Carbon Nanofibre—Polystyrene Composites", Nanotechnology, 2004, pp. 1545-1548, vol. 15, Institute of Physics Publishing.

* cited by examiner

CONDUCTING NANOTUBES OR NANOSTRUCTURES BASED COMPOSITES, METHOD OF MAKING THEM AND APPLICATIONS

REFERENCE TO RELATED APPLICATION

The present application is as national stage filing of International Application No. PCT/US2006/048165, filed on Dec. 19, 2006, which claims the benefit of U.S. Provisional Patent Application No. 60/751,705, filed Dec. 19, 2005, these disclosures are hereby incorporated by reference in their entirety into the present disclosure.

STATEMENT OF GOVERNMENT INTEREST

The work leading to the present invention was supported by National Science Foundation Grant No. GA10510 and NASA Grant No. GG10747. The government has certain rights in the invention.

FIELD OF THE INVENTION

The present invention is directed to electromagnetic interference (EMI) shielding materials and more particularly to such materials comprising nanotubes, nanofibers, or nanostructures dispersed in dielectric or partially conducting hosts. The present invention is further directed to a method for preparing such shielding materials and various applications.

DESCRIPTION OF RELATED ART

Electrically conducting polymer-matrix composites have gained popularity for electromagnetic interference shielding applications because they are lightweight, resistant to corrosion, and flexible and easily processed. These kinds of flexible conductive composites may be used for typical antenna systems, lightning-protected aircraft composite panels, avionics line replaceable unit (LRU) enclosures, connector gaskets, electrostatic and space charge dissipation materials, different types of electronic pressure sensitive switches or sensors, and many other uses. These polymeric composites must be made conductive by compounding them with an electrically conducting filler, such as metal particles and filaments, carbon particles (e.g., graphite and carbon black), and carbon fibers, in order to achieve the required shielding effectiveness. For any filler, the EMI shielding effectiveness increases with increasing filler concentration in the composites, but the maximum filler loading is limited by the poor composite mechanical properties at high filler loadings resulting from the poor filler-matrix bonding. For materials and process cost saving and good mechanical properties, the attainment of a high shielding effectiveness at a low filler loading is desirable.

Also, for effective and practical EMI shielding systems, being lightweight is an important technological requirement. However, to date, polymer foams with conductive materials dispersed therethrough have not been reported in the art.

SUMMARY OF THE INVENTION

There is thus a need in the art to address the above problems.

It is therefore an object of the invention to achieve high shielding effectiveness at low filler loading.

It is another object of the invention to improve the production of polymer-matrix composites.

It is still another object of the invention to provide lightweight, yet effective shielding materials.

It is yet another object of the invention to provide an inexpensive process for fabricating such shielding materials.

To achieve the above and other objects, the present invention is directed to effective electromagnetic interference (EMI) shielding materials that can be fabricated by dispersing small, high aspect ratio conducting cylinders into dielectric or partially conducting hosts. As a novel nanomaterial, carbon nanotubes (CNTs) have small unit sizes, high aspect ratios and many extraordinary mechanical and electrical properties. Such materials are called nanocomposites.

Multiwalled nanotubes (MWNTs) can be used in the present invention. Successful results have been demonstrated with low-cost carbon fibers, MWNTs, and combinations thereof.

Carbon nanofibers and nanotubes, as compared to conventional metals and carbon fillers, have remarkable structural, mechanical, and electrical properties, such as smaller diameters, larger aspect ratios, and much higher conductivities and strengths. The use of these carbon nanostructures as fillers in polymeric composites allows systems with low filler loadings to provide the desired electrical and EMI shielding properties.

According to the electromagnetic wave percolation theory, if the conductive filler in the polymer possesses a high aspect ratio, then the filler forms a conductive network easily, and the critical concentration of the conductive filler required to achieve the EMI shielding effect is low. Additionally, electromagnetic radiation at high frequencies penetrates only the near surface region of an electrical conductor. This is known as the skin effect. The depth at which the field drops to 1/e of the incident value is called the skin depth ($\delta$), which is given by $\delta = (2/f\mu\sigma)^{1/2}$, where f=frequency, $\mu$=permeability, and $\sigma$=electrical conductivity. Hence, the skin depth decreases with increasing frequency, permeability, or conductivity.

The invention is further directed to a preparation process for CNT-polymer nanocomposites. We developed an efficient technique to disperse carbon nanotubes within polymer matrix and fabricate carbon nanotube-polymer nanocomposites. In one embodiment, the preparation procedure of CNT-polystyrene nanocomposite was as follows. Initially, a fixed amount of nanotube was dispersed in a toluene solution containing a nonionic surfactant such as polyethylene glycol. The solution was contained in an ultrasonic bath to obtain a dispersed nanotube suspension, which was then combined with the polystyrene solution in toluene. The final mixture was further sonicated to give a black-colored stable solution with no detectable solid precipitation. The resulting solution was sprayed onto a flat plate by a micro-sprayer and dried at room temperature. Subsequently, the dried film was thermally cured in an air-circulating oven to remove toluene from the thin film. A series of composite films were prepared with carbon nanotube loading ranging from 0 to 20 wt % (percent by weight).

The following references (are hereby incorporated by reference herein in their entireties:

Yonglai Yang, Mool C. Gupta, Kenneth L. Dudley and Roland W. Lawrence. "Novel carbon nanotube-polystyrene foam composites for electromagnetic interference shielding", *Nano Letters*, 2005, 5, 2131.

Yonglai Yang, Mool C. Gupta, Kenneth L. Dudley and Roland W. Lawrence. "Conductive carbon nanofiber-polymer foam structures", *Advanced Materials*, 2005, 17, 1999.

Yonglai Yang, Mool C. Gupta, Kenneth L. Dudley and Roland W. Lawrence. "A comparative study of EMI shielding properties of carbon nanofiber and multi-walled carbon nanotube filled polymer composites", *Journal of Nanoscience and Nanotechnology*, 2005, 5, 927.

Yonglai Yang, Mool C. Gupta, Kenneth L. Dudley and Roland W. Lawrence. "Electrical conductivity and electromagnetic interference shielding of multi-walled carbon nanotube filled polymer composites", *Materials Research Society Symposium Proceedings*, 2005, 858E, HH5.3.

Yonglai Yang, Mool C. Gupta, Kenneth L. Dudley and Roland W. Lawrence. "The fabrication and electrical properties of carbon nanofibre-polystyrene composites", *Nanotechnology*, 2004, 15, 1545.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

A preferred embodiment of the present invention will be disclosed in detail with reference to the drawings, in which like reference numerals refer to like elements or steps throughout.

Figure 1:
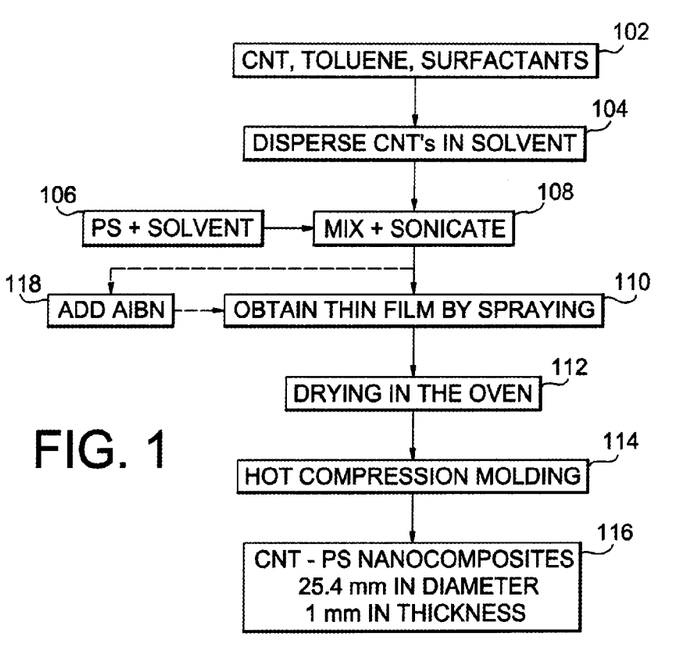
FIG. 1 is a flow chart showing a preparation procedure according to the preferred embodiment.

FIG. 1 is a flow chart showing the preparation procedure according to the preferred embodiment. Initially, in step 102, a fixed amount of nanotube was dispersed in a toluene solution containing a nonionic surfactant. The solution was contained in an ultrasonic bath in step 104 to obtain a dispersed nanotube suspension, which was then combined with the polystyrene solution in toluene, provided in step 106, to mix them in step 108. The final mixture was further sonicated to give a black-colored stable solution with no detectable solid precipitation. The resulting solution was sprayed onto a flat plate in step 110 by a micro-sprayer and dried at room temperature. Subsequently, the dried film was thermally cured in an air-circulating oven in step 112 to remove toluene from the thin film. A series of composite films were prepared with carbon nanotube loading ranging from 0 to 20 wt %.

In order to obtain the test specimens for conductivity and EMI shielding measurements, CNT-polymer composite thin films were folded, cut into pieces, put into a mold and hot pressed in step 114 at 250° C. under 20 MPa into disked-shape samples with 25.4 mm in diameter and 1 mm in thickness in step 116.

Other polymers could be used. Examples include polyimide, epoxies, and polyethylene.

Figure 2:
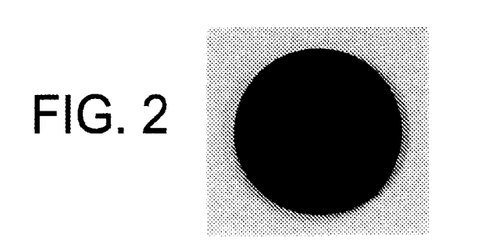
FIG. 2 is a photograph of a test specimen.

FIG. 2 is a photograph of a CNT-polymer test specimen.

Figure 3:
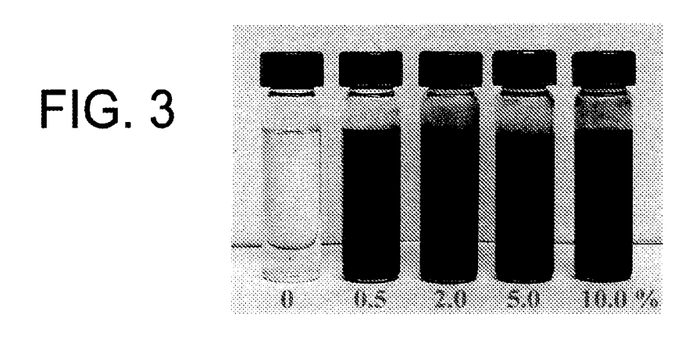
FIG. 3 is a photograph of suspensions with different nanotube loadings.

The dispersion state of carbon nanotubes within the polymer matrix is important in order to obtain a homogeneous and uniform composite. A photograph of the dispersed carbon nanotube-polystyrene dilute suspension in toluene with different nanotube loadings is shown in FIG. 3. It is evident that the suspension turns from a clear pure polymer solution into a black solution with increasing nanotube loading, and no traces of carbon deposits or other particulates are observed. This is ascribed to the use of a nonionic surfactant, which was used as a dispersing agent to improve the dispersion of nanotubes in solvent. The surfactant was coated onto the nanotube surface, which prevented the dispersed nanotubes from reaggregation based on the steric repulsion force between the surfactant-coated nanotubes. When the polystyrene solution was combined into the nanotube suspension, the highly viscous solution restricted Brownian motion and sedimentation, thus further stabilizing the nanotube dispersion from reaggregation.

Figure 4:
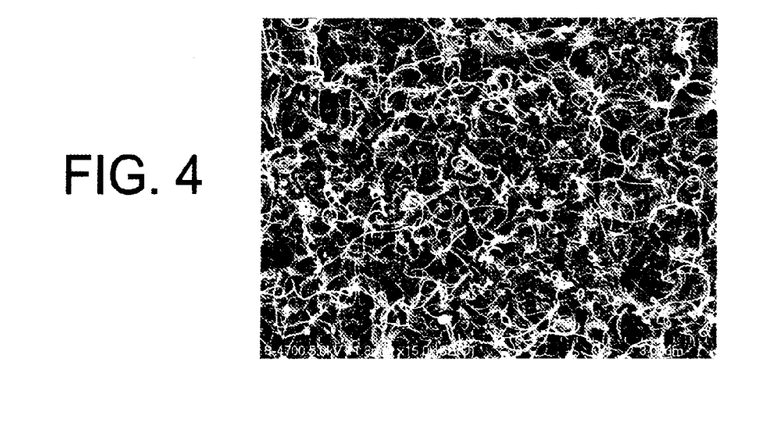
FIG. 4 is a scanning electron microscope image of a composite.

Scanning electron microscopy (SEM) was used to investigate the morphology and the embedded nature of nanotubes in the composites. FIG. 4 shows a typical SEM image of the fractured surface, which reveals that nanotubes are well dispersed and embedded uniformly throughout the polymer matrix. This uniform microstructure is attributed to the solution spraying technique in the formation of composite films, which allows the solvent to evaporate quickly and reduces the possibility of sedimentation and aggregation of carbon nanotubes.

Figure 5:
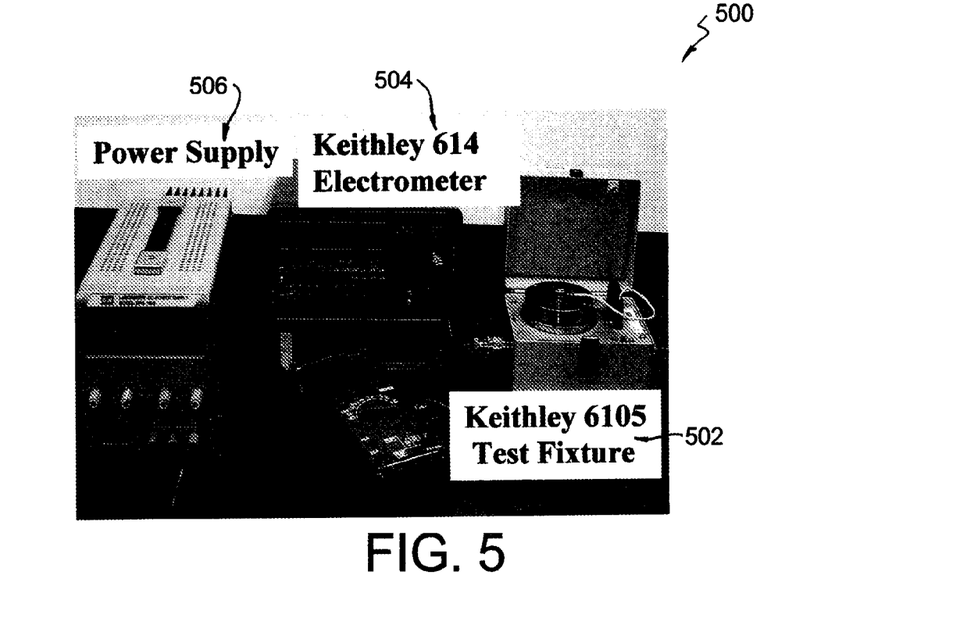
FIG. 5 shows a DC conductivity setup used to test the preferred embodiment.

The DC conductivity of the composites was measured. FIG. 5 shows a DC conductivity measurement setup 500. That setup was designed by coupling a Keithley 6105 resistivity test fixture 502, a Keithley 614 electrometer 504 and a power supply 506.

Figure 6:
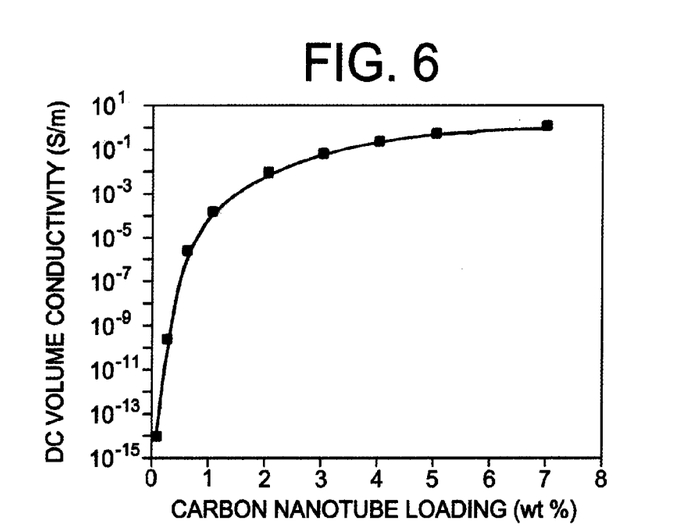
FIG. 6 is a plot of DC volume conductivity versus CNT loading.

FIG. 6 is a plot of the DC volume conductivity of composites versus CNT loading at room temperature. The conductivity increases with the increase in the amount of CNT content in the composite. A sharp increase of the conductivity is observed from $1.0 \times 10^{-14}$ S/m (pure polystyrene) to $2.3 \times 10^{-4}$ S/m (1 wt % (percent by weight) CNT-polystyrene), implying a percolation threshold at CNT loading ~1 wt %. The polystyrene matrix is electrically insulating, with the addition of the conductive CNTs into the polymer matrix, the percolation threshold is reached when a conductive path of interconnected nanotubes is formed across the volume of the CNT-polymer composite. The low percolation threshold is ascribed to the remarkable properties of carbon nanotubes, such as small sizes, large aspect ratios and high electrical conductivities, which helped to create extensive conductive networks that facilitate electron transport in the composite with a very low CNT loading.

Figure 7A:
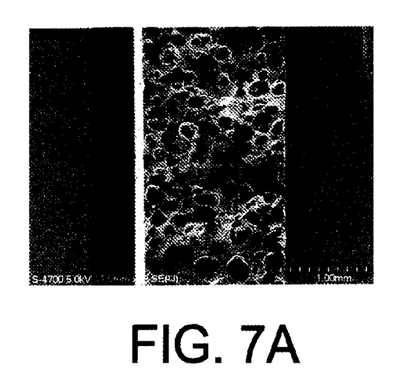
FIGS. 7A and 7B are scanning electron microscope images of composites with foam structures.
Figure 7B:
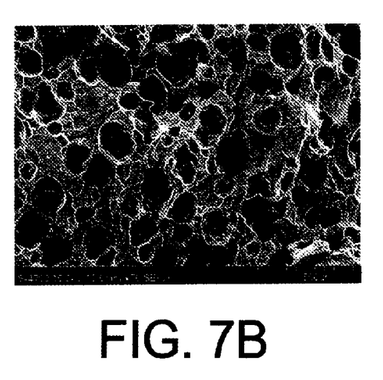

The present embodiment provides a novel and simple technique for producing CNT-polymer foam structures. Being lightweight is an important technological requirement for the development of practical EMI shielding systems. Therefore, we demonstrated the fabrication of foam structures to further reduce the weight of carbon nanotube-polymer composites. We used a gas-producing foaming agent 2,2'-Azoisobutyronitrile (AIBN), which was added to the mixture solution of dispersed carbon nanotubes and polystyrene (FIG. 1, step 118), and produced a carbon nanotube-polystyrene foam precursor. Of course, any alternative foaming technique could be used instead or in addition; one such foaming technique involves introducing air into the mixture. The foamable carbon nanotube-polystyrene composite films were obtained after spraying and drying the foam precursor. In the final hot-compression-molding process, the melted polystyrene matrix filled with carbon nanotubes was expanded by the nitrogen gas originated through decomposing foaming agent azo-compound AIBN, to form carbon nanotube-polystyrene foam structures. This is a simple and effective strategy to produce carbon nanotube-polymer foam structures with uniform cell distribution. FIGS. 7A and 7B are typical SEM images of such carbon nanotube-polystyrene foam structures.

It is evident that a foam structure with substantially spherical bubbles was formed throughout the carbon nanotube-polymer composite as shown in FIGS. 7A and 7B. The formation of such uniform foam structure is attributed to the use of a solid foaming agent, AIBN, which is stable at room temperature, but which readily decomposes at a higher temperature to give off a large volume of nitrogen gas. DC conductivity measurements indicated that such foam structure is electrically conductive and has a typical percolation behavior of carbon nanotube-polymer solid composite. The EMI shielding effectiveness data demonstrated that such conductive foam structures can be used as EMI shielding materials with light weight.

Figure 8:
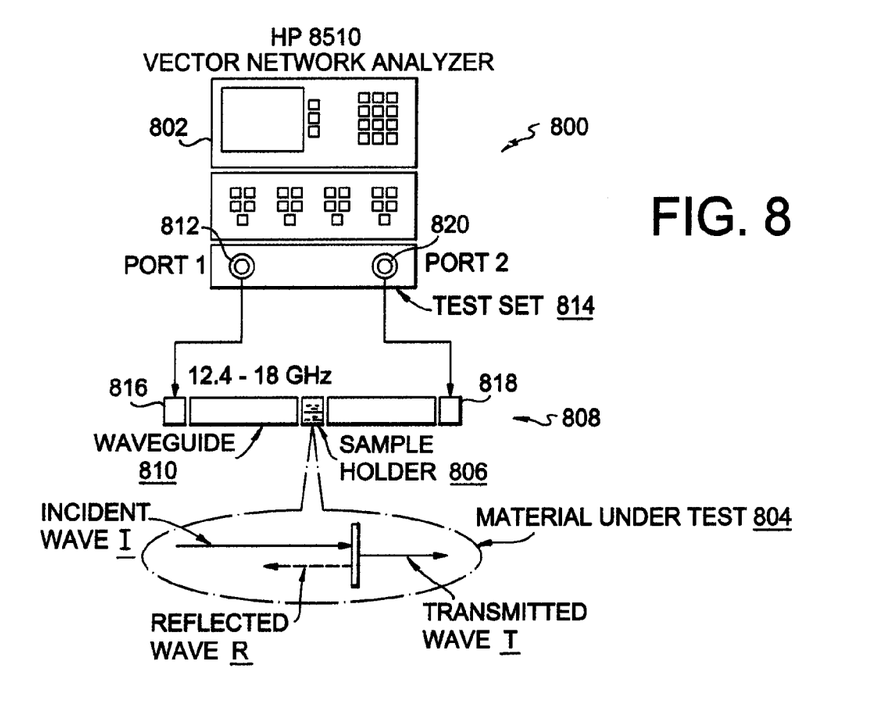
FIG. 8 is a schematic diagram of a setup for testing EMI shielding.

The CNT-polymer test specimens with different CNT loadings were delivered to NASA Langley for EMI shielding measurements. FIG. 8 shows the schematic diagram of the EMI shielding measurement setup 800. An HP 8510 vector network analyzer (VNA) 802 was used to measure the S-parameters of CNT-polymer composites in the frequency ranges of 8.2-12.4 GHz (X-band) and 12.4-18 GHz (Ku-Band).

Here, the S-parameter is a scattering parameter, i.e., how energy scatters from a material or device. The test sample 802 was cut into a rectangle to fit an aluminum waveguide sample holder 806. After the sample was placed into the sample holder, the sample holder was then fitted into the test fixture for the two-port measurement; once in place, the composite sample completely filled the waveguide opening in the waveguide 810. A full two-port VNA calibration was performed at the beginning of each test sequence to correct for systematic measurement errors by referencing to known boundary conditions. The radio frequency energy generated in the vector network analyzer 802 was directed from the test port 812 in the test set 814 to a transceiver 816 and thence through the waveguide 810 into the target test sample 804 as an incident wave I to produce a reflected wave R and a transmitted wave T. Then, the magnitude and phase response of the material under test to the incident stimulus of microwave energy was measured and recorded by using 201-point averaging. The measured scattering parameters included $S_{11}$, the forward reflection coefficient; $S_{21}$, the forward transmission coefficient; $S_{22}$, the reverse reflection coefficient; and $S_{12}$, the reverse transmission coefficient. The units of S-parameters are decibels (dB). While the reflected wave R was measured by the transceiver 816, the transmitted wave T was measured by a transceiver 818, which supplied a signal to a port 820 in the test set 814.

Figure 9:
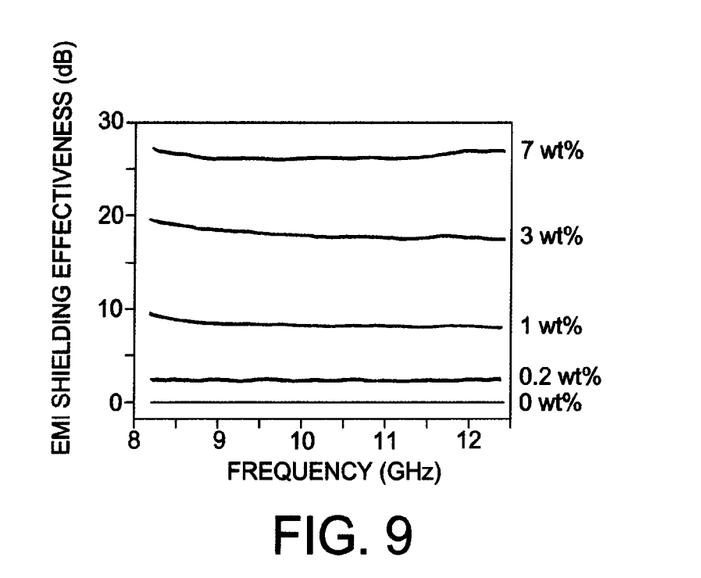
FIG. 9 a plot of EMI shielding effectiveness as a function of frequency for various CNT loadings.

The EMI shielding effectiveness of CNT-polymer composites with various loadings of carbon nanotubes as a function of frequency is presented in FIG. 9. The results exhibit that the shielding effectiveness of all composites is almost independent of frequency from 8.2 GHz to 12.4 GHz. Also, it can be seen from FIG. 9 that the shielding effectiveness of such composite enhances gradually with increasing CNT loading in the composite (shown as percentage by weight, or wt %). The shielding effectiveness of the CNT-polystyrene composite containing 7 wt % CNTs is measured to be ~26 dB in the measured frequency region. The polystyrene matrix in the composite is electrically insulating and does not contribute significantly to shielding. As a result, the formation of conductive CNT networks in the insulating polymer matrix renders composite the ability to effectively shield electromagnetic radiation. These results imply that such CNT-polystyrene composites can be commercially applied for the EMI shielding materials.

The specific EMI shielding effectiveness of the foam composite containing 7 wt % carbon nanotubes is calculated to be 33.1 dB·cm$^3$/g, which is much higher than that of typical metals (compared to 10 dB·cm$^3$/g for solid copper). Thus, the present invention can provide an effective and lightweight EMI shield.

Materials other than simple carbon nanotubes, nanofibers, and nanostructures can be used. For example, metal nanowires, nanotubes, nanofibers, or other nanostructures could be used to form electrically conducting nanocomposites. Another option is to introduce an organometallic compound (an organic compound containing a metal, which in this case could be a metal such as gold, silver, aluminum or copper) into the suspension and then heating the solution to convert the organometallic compound into a metallic phase to form metal-coated nanotubes, nanofibers, or nanostructures of carbon or the like. Such use of organometallic compounds can increase the conductivity of the nanotubes by a factor of ten or more. Still another option is to add an organic compound into the suspension and to decompose the organic compound by UV radiation or thermal radiation to convert that organic compound into a conducting phase to coat the nanotubes, nanostructures, or nanofibers. The nanotubes, nanofibers, nanowires, or other nanostructures could be vertically aligned to provide a highly conductive path, e.g., by applying an electromagnetic field during fabrication. The nanocomposites could be fabricated in film, bulk or fiber forms.

The invention has utility in areas other than those disclosed above. For example, the material could be formulated to improve any or all of its thermal properties, magnetic properties, structural properties, and surface properties. As an example of the last, the material could be made hydrophilic or hydrophobic.

Sensors could be fabricated based on the disclosed nanocomposites. For example, a change in a sensor's resistance could be monitored to measure strain or other physical and chemical parameters of interest.

Still other uses include the following:
a. Electronic clothing, textile.
b. Any applications where low density is desired, as the density of the nanocomposites according to the present invention can be lower than 0.56 g/cm$^3$.
c. Canopy for aircrafts.
d. Thin films of polymers that are electrically conducting.
e. Control of resistance by type and amount of nanotubes or nanofiber.
f. Use of electrically conducting polymer body for equipments such as computers and other electronic equipments.
g. Fabrication of electrically conducting ultra lightweight structures.
h. Fabrication of ultra lightweight antenna using conducting polymer composites.
i. Control of dielectric properties of materials by making nanocomposite.
j. Lightning protection.
k. Electromagnetic shielding for electronic components, motors, payloads.
l. Use of polyethylene could provide protection from radiation shielding as well as protection from electromagnetic interference signals.
m. Nanocomposites that can be electrically conducting to provide multi-functional capability such as embedded sensors for gas sensing or physical and chemical parameter monitoring.
n. Printed circuit boards.
o. Electronic packaging applications.
p. Corrosion inhibitors for aluminum, steel, or other metals (anti-corrosion coatings).
q. Electrostatic painting applications.
r. Antistatic additives.
s. Electromechanical actuators.

t. Conducting composites for electrical power equipments such as capacitors, transformers.

u. Applications requiring multilayered or patterned configurations, as the invention could easily be used to implement such.

v. Any applications for conducting polymers disclosed in Colin Pratt, "Applications of Conducting Polymers," published online at http://homepage.ntlworld.com/colin.pratt/appllcp.pdf, in which case the nanocomposites according to the present invention would replace the conducting polymers disclosed in that reference.

Yet another utility for the present invention lies in the area of biosensors. Electrically conducting polymers are known to have numerous features that allow them to act as excellent materials for immobilization of biomolecules and rapid electron transfer for the fabrication of efficient biosensors. Such polymers have wide applications in health care, food industries, and environmental monitoring.

While a preferred embodiment has been set forth above, those skilled in the art who have reviewed the present invention will readily appreciate that other embodiments can be realized within the scope of the invention. Some such embodiments have been noted above. Moreover, numerical values are illustrative rather than limiting, as are disclosures of specific chemical compositions. Therefore, the present invention should be construed as limited only by the appended claims.

We claim:

1. A method for producing an electrically conducting polymer-matrix composite, the electrically conducting polymer matrix composite comprising a matrix of a dielectric polymer and a nanotube, nanostructure, nanowire, or nanofiber material dispersed in the dielectric or partially conducting polymer matrix to cause the composite to be electrically conducting, the method comprising:
   (a) dispersing the nanotube, nanostructure, nanowire, or nanofiber material in a solvent in which the dielectric or partially conducting polymer is soluble to form a suspension;
   (b) combining the dielectric or partially conducting polymer with the suspension to form a mixture; and
   (c) drying the mixture to form the electrically conducting polymer-matrix composite.

2. The method of claim 1, wherein the nanotube, nanostructure, or nanofiber material comprises a carbon nanostructure material.

3. The method of claim 2, wherein the carbon nanostructure material comprises a carbon nanotube material.

4. The method of claim 2, wherein the suspension further contains a surfactant.

5. The method of claim 4, wherein the surfactant comprises a nonionic surfactant.

6. The method of claim 2, wherein the dielectric or partially conducting polymer comprises a polymer selected from the group consisting of polystyrene, polyimide, epoxies, polyethylene, and photo or thermal curable polymers.

7. The method of claim 6, wherein the solvent comprises toluene.

8. The method of claim 7, wherein step (b) comprises:
   (i) providing a solution of the polystyrene in toluene; and
   (ii) combining the suspension with the solution provided in step (b)(i).

9. The method of claim 8, wherein:
   step (b) further comprises (iii) adding a foaming agent to the mixture; and
   step (c) comprises causing the foaming agent to produce a foam of the dielectric or partially conducting polymer.

10. The method of claim 9, wherein the foaming agent comprises 2,2' Azoisobutyronitrile.

11. The method of claim 2, wherein step (c) comprises:
    (i) spraying the mixture into a film; and
    (ii) drying the film to produce a dried film.

12. The method of claim 11, wherein step (c) further comprises (iii) molding the dried film.

13. The method of claim 12, wherein step (c)(iii) comprises hot compression molding.

14. The method of claim 2, wherein the suspension further contains an organometallic compound, and wherein the method further comprises heating the solution in order to convert the organometallic compound to a metallic phase on carbon nanotubes or nanostructures.

15. The method of claim 14, wherein the metal comprises a metal selected from the group consisting of gold, silver, aluminum, and copper.

16. The method of claim 2, wherein the suspension further contains an organic compound capable of being decomposed by UV radiation or thermal radiation to convert the organic compound into a conducting phase that coats carbon nanotubes or nanostructures.

17. The method of claim 1, further comprising using the composite for electromagnetic interference shielding.

18. The method of claim 1, further comprising using the composite as a sensor to sense a physical condition or chemical change.

19. The method of claim 18, wherein the sensor has a resistance that changes according to the physical or chemical condition.

20. The method of claim 19, wherein the physical condition is strain.

21. The method of claim 1, further comprising using the composite in a textile.

22. The method of claim 21, wherein the textile is used in clothing.

23. The method of claim 1, further comprising using the composite in a canopy for aircraft.

24. The method of claim 1, further comprising forming the composite into an electrically conducting film.

25. The method of claim 1, wherein a type and amount of nanotubes or nanofibers are controlled to control a resistance of the composite.

26. The method of claim 1, further comprising using the composite in a body for electronic equipment.

27. The method of claim 1, further comprising using the composite in fabrication of an electrically conducting ultra lightweight structure.

28. The method of claim 27, wherein the structure comprises an antenna.

29. The method of claim 1, further comprising using the composite in control of dielectric properties of materials.

30. The method of claim 1, further comprising using the composite for lightning protection.

31. The method of claim 1, further comprising using the composite for electromagnetic shielding for an electric or electronic device.

32. The method of claim 1, wherein the polymer comprises polyethylene, and further comprising using the composite for radiation shielding and protection from electromagnetic interference signals.

33. The method of claim 1, further comprising using the composite as an embedded sensor or composite containing embedded sensor.

34. The method of claim 1, further comprising using the composite in a printed circuit board.

35. The method of claim 1, further comprising using the composite in electronic packaging.

36. The method of claim 1, further comprising using the composite as a corrosion inhibitor for a metal.

37. The method of claim 1, further comprising using the composite in electrostatic painting.

38. The method of claim 1, further comprising using the composite in an antistatic mode.

39. The method of claim 1, further comprising using the composite in an electromechanical actuator.

40. The method of claim 1, further comprising using the composite in electrical power equipment.

41. The method of claim 1, further comprising incorporating the composite into a multilayered or patterned configuration.

* * * * *